United States Patent Office

2,779,745
Patented Jan. 29, 1957

2,779,745

WAX-COATED SYNTHETIC RUBBER CRUMB COAGULA FOR INCORPORATION IN ASPHALT

Louis H. Howland, Watertown, Conn., assignor to United States Rubber Company, New York, N. Y., a corporation of New Jersey No Drawing. Application December 21, 1953,
Serial No. 399,635

6 Claims. (Cl. 260—28.5)

This invention relates to improvements in synthetic rubber crumb coagula for incorporation in asphalt.

It is known to coagulate synthetic rubber latices in crumb form and to incorporate the crumb coagula in asphaltic bitumen that is to be used as a binder for mineral aggregate used in the building of roads. The synthetic rubber-asphalt mixes are made by heating the asphalt and crumb synthetic rubber together generally at a temperature from 250° F. to 350° F. until the synthetic rubber is dispersed or dissolved in the asphalt and the mixture assumes a smooth condition. As shown at the bottom of page 335 and top of page 336 of the article "Effect of Synthetic Elastomers on Properties of Petroleum Asphalt" by Endres, et al., Ind. Eng. Chem. 43, 334–340, heating of the asphalt and rubber powder at about 300° F. (150° C.) for five hours is necessary to reach equilibrium. It is desired to reduce this time of heating the asphalt and rubber.

The present invention material reduces the time necessary to uniformly disperse the synthetic rubber crumb coagula in the asphalt.

According to the present invention, the synthetic rubber crumb coagula are coated with a wax and the thus treated synthetic rubber crumbs may be dispersed to a smooth condition in the heated asphalt in much less time than untreated synthetic rubber crumb coagula. The wax may be a conventional mineral, vegetable or animal wax, e. g., paraffin, ozokerite, ceresin, montan wax, carnauba wax, beeswax, Chinese insect wax, Japan wax, myrtle wax, candelilla wax, spermaceti, or mixtures of any of them. Synthetic rubber latices containing dispersing agents are conventionally coagulated in the form of a slurry of crumb coagula by addition of polyvalent metal salts or acids, often in conjunction with alkali-metal salts, and this slurry is filtered and the synthetic rubber crumbs are dried. The wax may be dispersed in water by means of a small amount of a conventional surface-active dispersing agent and the dispersion added to the synthetic rubber latex before coagulation, whereby the coagulant will co-coagulate the rubber with the wax for the most part as a coating on the synthetic rubber crumbs. The aqueous dispersion of the wax may be added to the slurry of coagulated rubber crumbs containing excess coagulant from coagulation of the latex, to coagulate the paraffin on the previously formed rubber crumbs. The wax as such may be added in melted form to a heated slurry of the coagulated rubber crumbs and the mixture cooled, whereby the wax forms a coating. The resultant wax coated synthetic rubber crumbs in the aqueous medium prepared in any of the above manners are readily filtered and dried to form crumbs which are readily dispersible in hot asphalt. The wax-coated synthetic rubber crumbs may be in the range from 4 to 325 mesh, and generally will be in the range from 20 to 250 mesh.

The preferred wax used in the present invention is the conventional paraffin which is a mixture of saturated hydrocarbons obtained from the paraffin-containing fractions from tars or paraffin-bearing petroleum by chilling and filtering, pressing out oil from the filtered "slack-wax" or "scale wax" in a filter press, and then removing further oil by "sweating" as by warming in hollow pans with false bottoms on which the pressed wax rests while the residual oil flows from the wax into troughs. The amount of paraffin or other wax used to coat the synthetic rubber crumbs is not critical, and generally will be from 2% to 25% by weight of the synthetic rubber. The wax coated synthetic rubber crumbs may be added to the hot asphalt in amounts from 1 to 15 parts of rubber per 100 parts of asphalt. The temperature of the asphalt may be from 250° F. to 350° F. The wax coated rubber crumbs will readily disperse in the asphalt to a smooth condition.

The asphalts used for binders for aggregate in road building are semi-solid asphalts and are usually bought and graded by certain specified penetration ranges at 77° F. The penetration is expressed as the distance in tenths of a millimeter that a tapered standard needle (0.14 to 0.16 mm. tip diameter) will penetrate the asphalt in 5 seconds with a 100-gram load (A. S. T. M. D5–49). For example, asphalts having a penetration range of 40–50 or 60–70 may be specified for use in hot climates, asphalts having a penetration range of 70–85 or 85–110 may be specified for use in temperate climates, and asphalts having a penetration range of 110–120 or as high as 200–300 may be specified for use in cold climates. These are all low softening point asphalts having softening points from 100° F. for the high penetration asphalts to 150° F. for the low penetration asphalts. Softening points are measured by the ring and ball method (A. S. T. M. E28–51T). The rubber containing asphalt binder prepared by blending the asphalt at elevated temperature, e. g., 250° F. to 350° F., with the wax coated synthetic rubber crumbs may be mixed with the aggregate in a pug-mill at temperatures from 250° F. to 400° F. (generally 300° F. to 350° F.) and dumped into trucks for transport to the paving site, or the hot rubber-containing asphalt binder may be sprayed on the aggregate that has been previously rolled dry on the road to penetrate the same.

The synthetic rubber latex for preparation of the rubber crumbs may be a so-called butadiene polymer synthetic rubber latex, i. e., an aqueous emulsion polymerizate of one or more butadienes-1,3, for example, butadiene-1,3, 2-methylbutadiene-1,3 (isoprene), 2-chloro-butadiene-1,3 (chloroprene), 2,3-dimethyl-butadiene-1,3, piperylene, or a mixture of one or more such butadienes-1,3 with one or more other polymerizable compounds which are capable of forming rubbery copolymers with butadienes-1,3, for example, up to 70% by weight of such mixture of one or more compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadiene-1,3 hydrocarbons are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; methyl vinyl ether; methyl vinyl ketone; vinylidene chloride; vinyl pyridine; alkyl vinyl pyridines.

The following illustrates the invention. All parts and percentages referred to herein are by weight.

To 50 parts dry weight basis of a 20% solids GR–S latex (emulsion polymerizate of a major proportion of butadiene-1,3 and a minor proportion of styrene, viz, butadiene to styrene ratio of 76.5:23.5) were added 0.7 part of an antioxidant suspended in 2.8 parts of water and 2.5 parts of sodium stearate dissolved in 47.5 parts of water. To this mixture was added 300 parts of a 6% aqueous sodium chloride solution to destabilize or cream the latex, followed by 300 parts of an aqueous solution containing 0.7% aluminum sulfate and 1% sodium chloride to coagulate the rubber in the latex to crumb form. The thus formed slurry of rubber crumbs was heated to boiling and 5 parts of melted paraffin (household grade, melting point 47–50° C.) was added with stirring. The mixture was then cooled to room temperature by the addition of cold water. The thus formed synthetic rubber crumbs with a coating of solid paraffin were filtered, washed with water, and dried for 16 hours at 50° C. The size of the coated rubber crumbs was 25 to 100 mesh.

An amount of the dried paraffin coated synthetic rubber crumbs equivalent to 5.7 parts of rubber (6.25 parts of the paraffin coated crumbs) was added to 125 parts of petroleum asphalt having a softening point of 110–120° F., and was held at 300° F. for two hours. The mixture was completely smooth and remained smooth overnight. Rubber crumbs in the same amount, based on the rubber, similarly prepared but without the paraffin coating required at least four hours for dispersion to a smooth condition.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. The method of preparing an asphalt-synthetic rubber mix which comprises heating at a temperature above the softening point of the asphalt, a mixture of the asphalt and a butadiene polymer synthetic rubber in crumb form coated with material selected from the group consisting of mineral, vegetable and animal waxes.

2. The method of preparing an asphalt-synthetic rubber mix which comprises heating at a temperature above the softening point of the asphalt, a mixture of the asphalt and a butadiene polymer synthetic rubber in crumb form coated with paraffin.

3. The method of preparing an asphalt-synthetic rubber mix which comprises heating at a temperature above the softening point of the asphalt a mixture of the asphalt and a butadiene polymer synthetic rubber in crumb form coated with 2% to 25% of material selected from the group consisting of mineral, vegetable and animal waxes based on the synthetic rubber.

4. The method of preparing an asphalt-synthetic rubber mix which comprises heating at a temperature above the softening point of the asphalt a mixture of the asphalt and a butadiene polymer synthetic rubber in crumb form coated with 2% to 25% of paraffin based on the synthetic rubber.

5. The method of preparing an asphalt-synthetic rubber mix which comprises heating at a temperature from 250° F. to 350° F., a mixture of asphalt having a softening point of 100° F. to 150° F. and the dried crumb coagula of a butadiene-styrene copolymer synthetic rubber latex coated with material selected from the group consisting of mineral, vegetable and animal waxes, said synthetic rubber being in amount from 1 to 15 parts by weight per 100 parts of the asphalt, and such wax being in amount from 2% to 25% by weight of the synthetic rubber.

6. The method of preparing an asphalt-synthetic rubber mix which comprises heating at a temperature from 250° F. to 350° F., a mixture of asphalt having a softening point of 100° F. to 150° F. and the dried crumb coagula of a butadiene-styrene copolymer synthetic rubber latex coated with paraffin, said synthetic rubber being in amount from 1 to 15 parts by weight per 100 parts of the asphalt, and the paraffin being in amount from 2% to 25% by weight of the synthetic rubber.

References Cited in the file of this patent

UNITED STATES PATENTS

| | | |
|---|---|---|
| 2,408,297 | Cubberly | Sept. 24, 1946 |
| 2,501,123 | Cox | Mar. 21, 1950 |
| 2,509,777 | McMillan et al. | May 30, 1950 |

OTHER REFERENCES

Industrial and Engineering Chemistry, volume 43, No. 2, February, 1951, pages 334–340.